United States Patent [19]

Lundgren

[11] 4,250,395
[45] Feb. 10, 1981

[54] DEVICE FOR GENERATING ELECTRICITY BY PEDESTRIAN AND VEHICULAR TRAFFIC

[76] Inventor: Roy L. Lundgren, 1360 NE. 48th Ct., Ft. Lauderdale, Fla. 33334

[21] Appl. No.: 50,635
[22] Filed: Jun. 21, 1979
[51] Int. Cl.³ .............................................. H02P 9/04
[52] U.S. Cl. ................................................. 290/1 R
[58] Field of Search ...................... 290/1 R; 417/229; 340/31 R; 74/142

[56] References Cited

U.S. PATENT DOCUMENTS 1,916,873  7/1933  Wiggins ............................. 290/1 R Primary Examiner—David Smith, Jr.
Assistant Examiner—John B. Conklin
Attorney, Agent, or Firm—Quaintance, Murphy & Richardson

[57] ABSTRACT

Energy expended by pedestrian or vehicular traffic is captured by a device which includes a plurality of tread plates which when depressed by traffic thereupon drive rocker arms mounted by one way clutches on a shaft. The rocker arms are spring biased upwardly to keep the tread plates normally raised so that the tread plates return to their initial position after being depressed. Preferably, the shaft is connected to a generator, and the generator to a battery so as to store electrically the energy captured mechanically. By using the aforedescribed configuration a relatively thin device is achieved which can be conveniently installed under a carpet and used in the doorways of buildings or other heavy traffic areas.

14 Claims, 10 Drawing Figures

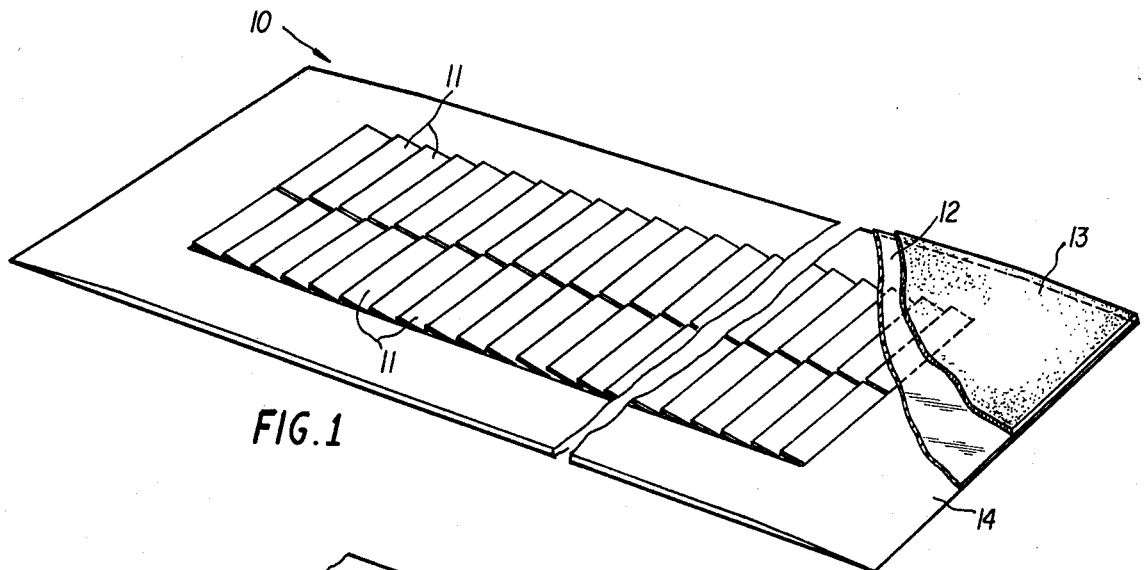
FIG. 1
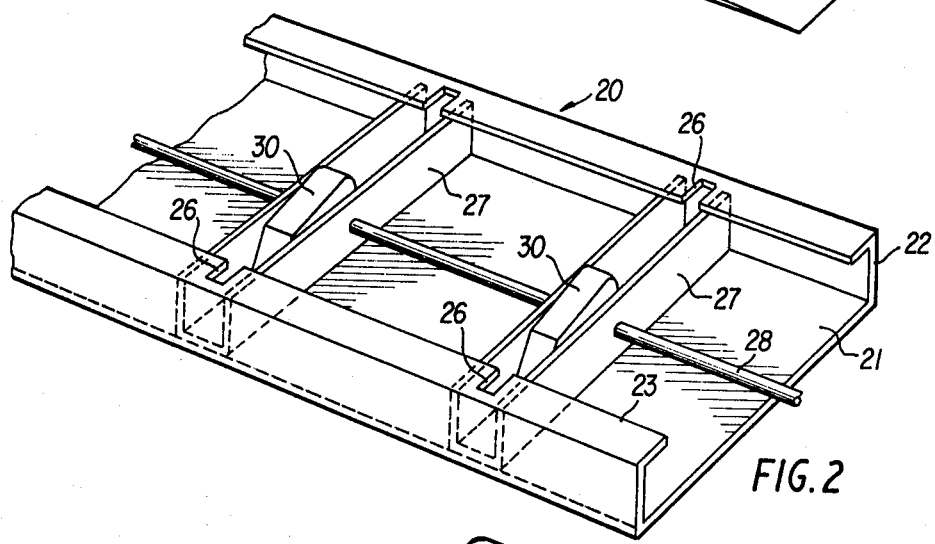
FIG. 2
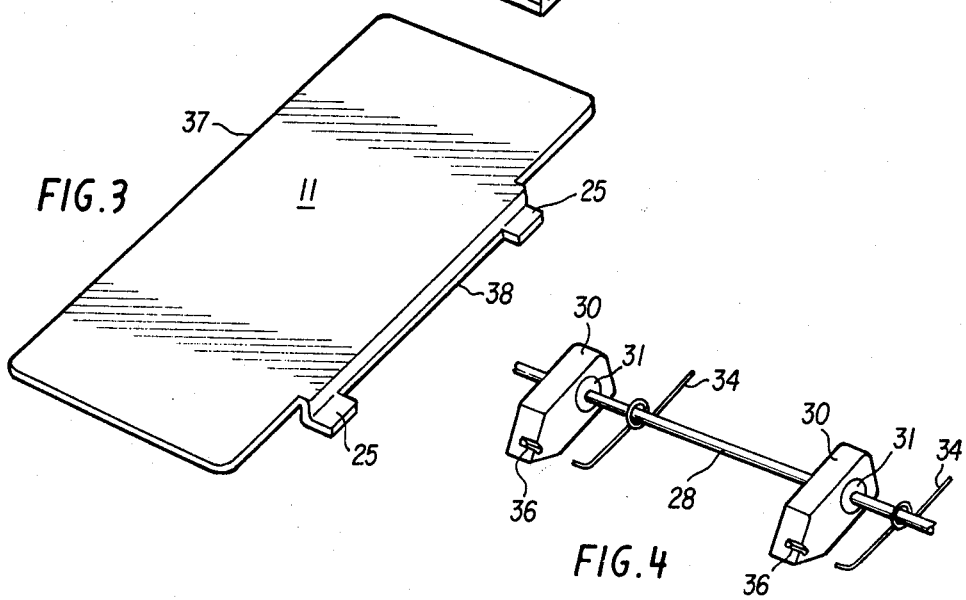
FIG. 3
FIG. 4

DEVICE FOR GENERATING ELECTRICITY BY PEDESTRIAN AND VEHICULAR TRAFFIC

BACKGROUND OF THE INVENTION

1. Field of the Invention

This invention relates to an apparatus for generating electricity, and more particularly, this invention relates to apparatus for generating electricity by application of gravitational forces due to traffic from pedestrians or rolling vehicles.

2. Prior Art and Other Considerations

A great deal of energy is expended by and thus available from traffic, such as traffic from pedestrians or rolling vehicles. Generally, this energy is not recouped and put to useful purposes because to date, there are no viable devices for capturing this energy. Pedestrian traffic on city streets or in the entrances and exits of buildings is considerable, and in view of the growing scarcity of energy, tapping that energy so as to recoup some portion of it is one way to save or redirect available energy.

U.S. Pat. No. 3,944,855 discloses a device for tapping such an energy source, however, the device requires a considerable amount of vertical room and is therefore not readily adaptable to existing structures. Furthermore, the device does not provide a mechanism for continuously applying torgue to a generator while a pedestrian or vehicle traverses the device.

Accordingly, there is a need for an apparatus which lends commercial viability to the concept of tapping energy made available through the flow of pedestrian and vehicular traffic.

SUMMARY OF THE INVENTION

In view of the foregoing considerations it is an object of the instant invention to provide new and improved apparatus for recouping energy expended by traffic flow. To this end, the instant invention contemplates a support for carrying tread plates, rocker arms and a torque transmitting shaft wherein the tread plates absorb forces created by traffic flow and transmit forces through the rocker arms to the shaft. Preferably, the shaft transmits the forces in the form of torgue to an electric generator.

BRIEF DESCRIPTION OF THE DRAWINGS

FIG. 1 is a perspective view of an assembled apparatus for generating electricity, according to the instant invention showing a plurality of tread plates arranged in parallel rows and covered by a flexible member such as a carpet, or the like;

FIG. 2 is a perspective view showing a support channel utilized to support the plurality of tread plates shown in FIG. 1;

FIG. 3 is a perspective view of a tread plate for mounting in the channel of FIG. 2;

FIG. 4 is a perspective view of rocker arms mounted on a torgue transmitting shaft, which arms and shaft are retained within the channel of FIG. 2;

DETAILED DESCRIPTION OF PREFERRED EMBODIMENT

Figure 5:
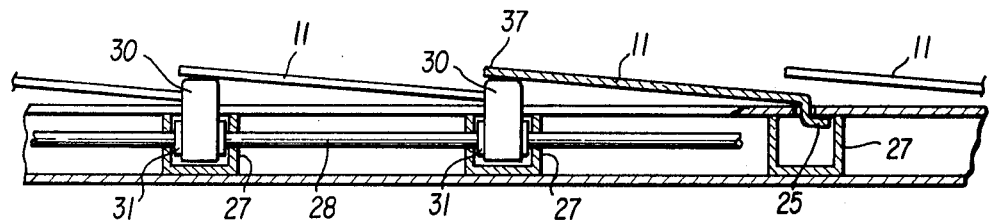
FIG. 5 is a vertical cross section of the apparatus shown in FIG. 1.

Referring now to FIG. 1, there is shown an apparatus 10 in accordance with the instant invention wherein a plurality of tread plates 11, are arranged in a pair of rows and contained in a low profile unit for installation in heavy traffic areas such as the entrances and exists of department stores and buildings. Preferably, the apparatus 10 is self-contained and includes an electric generator which is connected to exterior circuitry by leads (not shown), or the like, extending from the apparatus. The leads are connected to a battery charger (not shown) so as to store electricity for general use or for specialized situations such as power failures. Preferably, the apparatus 10 is covered with a plastic sheet 12 to keep out dirt and has a profile low enough so that it can be inserted beneath a carpet 13 without being particularly obtrusive. Ramps 14 are provided at each end of the apparatus 10 so as to provide a smooth contour for the apparatus.

Referring now to FIGS. 2-5, there is shown in FIG. 2 a channel section 20, which serves as a support member for a plurality of the tread plates 11. The channel 20, has a bottom plate 21, and a pair of upright side plates 22, which join a pair of top flanges 23 to the bottom plate to form an enclosure. The tread plates 11 have spaced tabs 25, thereon which are received in spaced, opposed slots 26 cut in the flanges 23, so as to pivotally support the tread plates. A plurality of U-shaped bearing boxes 27 are contained within the channel 20 beneath the top flanges 23. The bearing boxes 27 have a shaft 28 journaled therethrough and having axes of rotation extending in the same direction as the direction of traffic flow. The shaft 28 is used to transmit torque to a generator, as will be explained hereinafter. Each bearing box 27 has a rocker arm 30 mounted therein and secured to the shaft 28 by a one-way clutch 31. The one way clutch may be of the roller-ratchet type such as the roller-ratchet clutch 52 shown in U.S. Pat. No. 1,916,873 issued to E. B. Wiggins on July 4, 1933. The one-way clutches 31 engage when the rocker arms 30 pivot in one direction and disengage when the rocker arms pivot in the opposite direction to let the rocker arms 30 return freely to the raised position. Each rocker arm 30 is biased to a raised position by a spring 33 which has one tail 34 resting on the bottom of the bearing box 27 and a second tail 35 received in an opening 36 in the rocker arm.

As seen in FIG. 5, each tread plate 11 has its free end 37 resting on a rocker arm 30, which rocker arm projects through a space 38 between the tabs 25, of the next tread plate 11. When a person steps on a tread plate 11, the tread plate moves from its raised position shown in FIG. 5 to a relatively flush lower position causing the rocker arm 30 to move from its raised position to its lowered position. The one-way clutch 31, engages as the rocker arm moves from its raised to its lower position thereby rotating the shaft 28. When the person's foot moves off the tread plate 11, the spring 33 rotates the rocker arm to its raised position thereby raising the tread plate 11 to its raised position so that a subsequent foot step can depress the tread plate and turn the shaft 28 further. Since there are a plurality of plates 11, the shaft 28 will tend to rotate continuously as a pedestrian walks along the unit 10. Accordingly, a generator connected to the shaft 28 will continuously generate electrical power. Preferably, a battery charger is connected to the generator so as to charge a battery and store energy as traffic moves along the apparatus.

Figure 6:
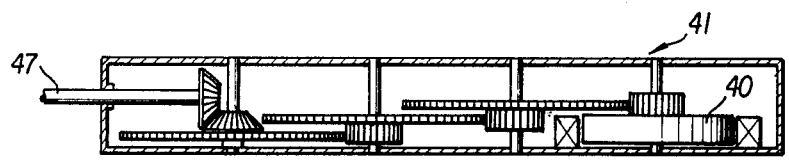
FIG. 6 is a side elevation of an electric generator and a gear train connected to the shaft of FIG. 4 to drive the generator upon depressing the tread plates shown in FIGS. 1 and 3.
Figure 7:
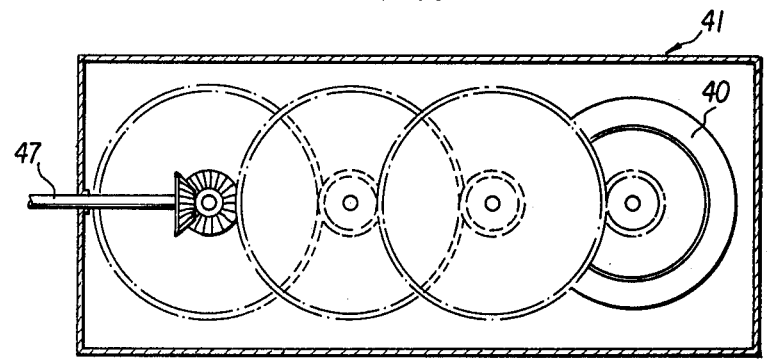
FIG. 7 is a top view of the generator and gear train shown in FIG. 6.
Figure 8:
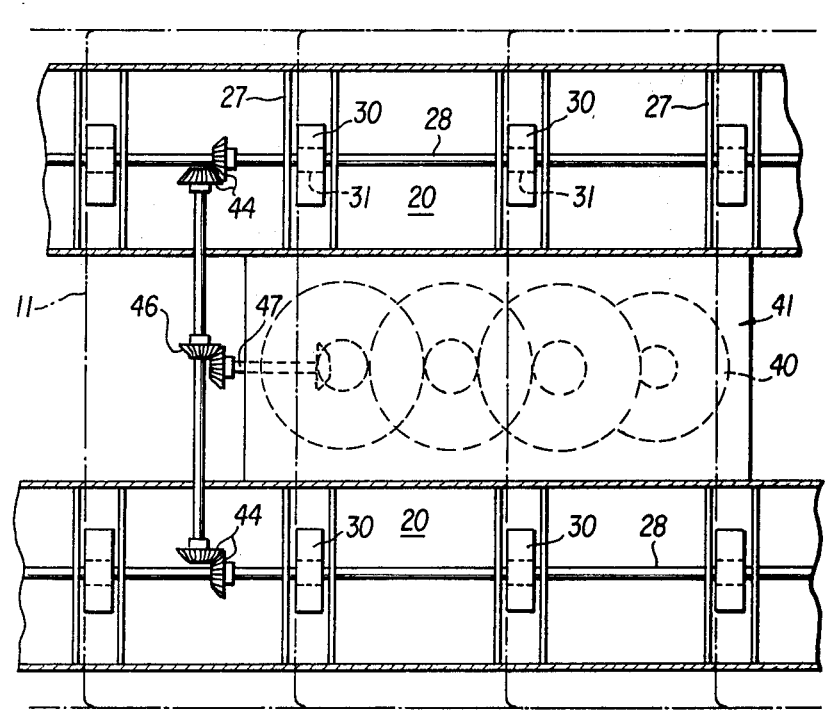
FIG. 8 is a top view of the apparatus as shown in FIG. 1, with the tread plates in phantom.
Figure 9:
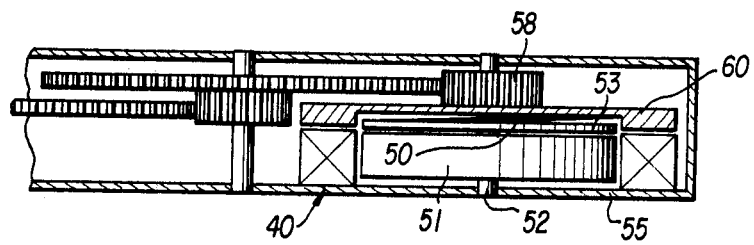
FIG. 9 is a side elevation similar to FIG. 6 showing a spring inserted between the generator rotor and gear train.

FIGS. 5, 6, and 7 show a proposed commercial application of the preferred embodiment wherein a generator 40 is connected to a pair of parallel shafts 28 via a train of gears 41 which gear down the torque in shafts 28 and provide a high speed input to the generator. As seen in FIG. 8, the generator and gear train are disposed between a pair of channels 20 arranged in parallel which mount parallel rows of tread plates 11 in the manner shown in FIG. 1. The shafts 28 are geared by miter gears 44 to a transverse shaft 45 which in turn is geared by a mitor gear 46 to an input shaft 47 of the gear train 41. In this way, a relatively compact torque transmitting arrangement is achieved having a high speed output.

As seen in FIG. 6, the generator 40 is configured with a low profile and the gear train 41 has the gears arranged in a horizontal array with axes perpendicular to the tread plates 11 to also provide a low profile. Accordingly, both the gear train 41 and generator 40 can be contained within the thin unit 10 shown in FIG. 1. The gear train 41 converts the relatively low speed and high force applied to shaft 28 and through shaft 45 to a high speed rotation in generator 40, which rotation is maintained due to the inertia of the device even when there is relatively intermittent force applied to the tread plates 11 of the unit 10.

Figure 10:
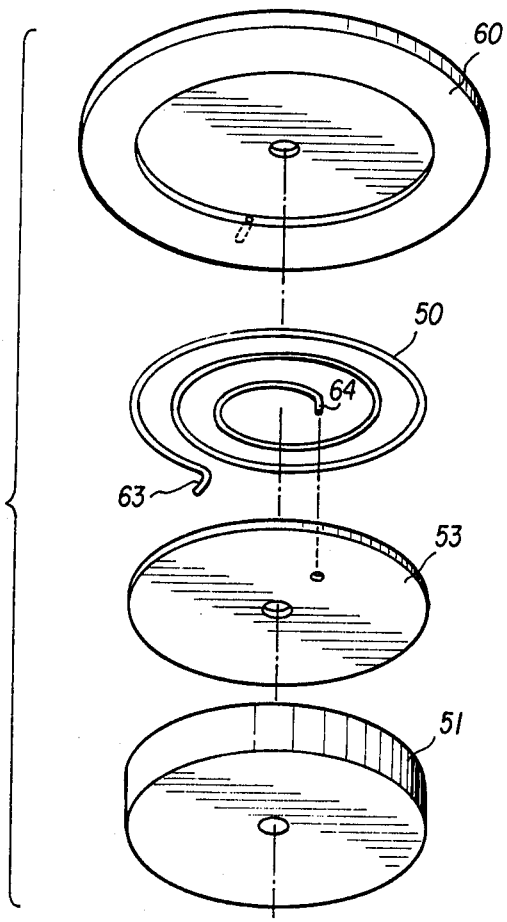
FIG. 10 is an exploded view in perspective showing how the spring is connected between a flywheel and rotor.

Due to the relatively high impulse necessary to impart starting torque to the generator, it is preferable to include a spiral spring 50 between the gear train 41 and rotor 51 of the generator 40. As is seen in FIG. 10, the rotor 51 is fixed to a shaft 52 on which a rotor disc 53 is also fixed. The shaft 52 is journalled in casing 55 which contains the generator 40 and gear train 41 so as to rotate freely in the casing. The gear train 41 ends with a pinion gear 58 which is freely rotatable on the shaft 52 and a fly wheel 60 is fixed to the pinion gear and also freely rotatable on the shaft. The spring 50 has one end 63 fixed to the fly wheel 60 and the other end 64 fixed to the rotor disc 53.

Upon applying torque to the fly wheel 60 by pinion gear 58, the spring 50 is wound to the point where the force stored therein exceeds the force necessary to overcome the moment of inertia of the rotor 51 at which time the rotor begins to turn. Consequently, the high torque necessary to start rotation of the rotor is created by storing energy in the spring 50 until sufficient energy is available.

The foregoing embodiment is merely illustrative of the invention which is to be limited only by the following appended claims.

I claim:

1. An apparatus for recouping energy from traffic flow comprising:
    support means;
    tread plate means for transmitting forces generated by traffic flow over the treaded plate means;
    means mounting the tread plate means on the support means for movement relative thereto between a raised and lowered position;
    rocker arm means engaged by the tread plate means for rotation about a pivot of said rocker arm means from a raised to a lowered position as the tread plate means moves from the raised to the lowered position;
    shaft means for transmitting torque;
    means mounting said pivot of the rocker arm means directly to the shaft means to rotate the shaft upon rotation of the rocker arm means, said mounting means including one-way clutch means which engages the shaft means when the rocker arm is rotated from the raised to the lowered position and disengages when the rocker arm means returns to the raised position, and
    means connected to the shaft means for storing or converting energy.

2. The apparatus of claim 1 wherein the means for mounting the tread plate means includes pivot means along one side of the tread plate means.

3. The apparatus of claim 2 further including spring means for returning the tread plate means to the raised position.

4. The apparatus of claim 3 wherein the spring means is a spring disposed between the rocker arm means and support means.

5. The apparatus of claim 1 or 4 further including generator means connected to the shaft means for generating electricity as the shaft means rotates.

6. The apparatus of claim 4 wherein the tread plate means includes a plurality of tread plates, wherein the rocker arm means includes a plurality of rocker arms, and wherein each tread plate has an rocker arm associated therewith connected to the shaft means by the one-way clutch means, whereby rotation of the shaft means is perpetuated by sequential application of force to the tread plates.

7. The apparatus of claim 6 further including generator means connected to the shaft means for generating electricity as the shaft rotates.

8. The apparatus of claim 7 wherein the support means includes a channel section including transverse bearing members through which the shaft means is journalled and adjacent to which the rocker arms rotate.

9. The apparatus of claim 8 wherein the channel section has spaced top surfaces and a bottom surface joined by relatively low side walls which define a unit with a relatively low profile within which the shaft means, bearing members and rocker arm are contained.

10. The apparatus of claim 9 wherein the pivot means includes opposed slots in each of the top surfaces of the channel member and spaced tabs on each tread plate with each tab being received in one of the slots, and wherein a rocker arm is received between the top surfaces and in the space between the tab means for rotation by the preceding tread plate.

11. The apparatus of claim 10 further including a plurality of parallel channels, each having shaft means and a plurality of rocker arms and tread plates, said shaft means being joined by transverse shaft means which transverse shaft means is geared through a train of gears to the generator means.

12. The apparatus of claim 11 further including spring means disposed between the train of gears and the generator means for accumulating sufficient energy to impart starting torque to the generator means.

13. The apparatus of claim 1, 2 or 4 wherein the rocker arm means includes a plurality of rockers mounted in spaced relation on the shaft means, the shaft means having an axis of rotation extending in the same direction as the flow of traffic and wherein the apparatus further includes generator means connected to the shaft means for generating electricity as the shaft means rotates.

14. The apparatus of claim 1, 2 or 4 wherein the rocker arm means includes a plurality of rockers mounted in spaced relation on the shaft means, the shaft means having an axis of rotation extending in the same direction as the flow of traffic; and wherein the apparatus further includes generator means connected to the shaft means by gear means for generating electricity as the shaft means rotates, the generator means and gear means having axes of rotation substantially perpendicular to the tread plate means.

* * * * *